United States Patent
Halpenny-Mason

(10) Patent No.: US 12,270,787 B1
(45) Date of Patent: Apr. 8, 2025

(54) INDUSTRIAL ULTRASONIC INSPECTION WITH SPARSE RECEIVE

(71) Applicant: DarkVision Technologies Inc., North Vancouver (CA)

(72) Inventor: Michael Halpenny-Mason, North Vancouver (CA)

(73) Assignee: DarkVision Technologies Inc., North Vancouver (CA)

( * ) Notice: Subject to any disclaimer, the term of this patent is extended or adjusted under 35 U.S.C. 154(b) by 0 days.

(21) Appl. No.: 18/855,169

(22) PCT Filed: Mar. 30, 2023

(86) PCT No.: PCT/IB2023/053173
§ 371 (c)(1),
(2) Date: Oct. 8, 2024

(87) PCT Pub. No.: WO2023/194850
PCT Pub. Date: Oct. 12, 2023

(30) Foreign Application Priority Data

Apr. 8, 2022 (GB) ..................................... 2205225

(51) Int. Cl.
*G01N 29/06* (2006.01)
*G01N 29/26* (2006.01)
*G01N 29/36* (2006.01)

(52) U.S. Cl.
CPC .......... *G01N 29/069* (2013.01); *G01N 29/262* (2013.01); *G01N 29/36* (2013.01); *G01N 2291/0234* (2013.01); *G01N 2291/0289* (2013.01); *G01N 2291/106* (2013.01)

(58) Field of Classification Search
CPC . G06F 11/068; G06F 11/1004; G06F 13/1668
USPC .......................................................... 714/764
See application file for complete search history.

(56) References Cited

U.S. PATENT DOCUMENTS

| | | | | |
|---|---|---|---|---|
| 6,048,315 | A * | 4/2000 | Chiao | G01S 15/8997 600/447 |
| 6,506,154 | B1 * | 1/2003 | Ezion | G10K 11/341 600/437 |
| 6,789,427 | B2 * | 9/2004 | Batzinger | G01N 29/4436 73/625 |
| 10,478,154 | B2 * | 11/2019 | Brown | A61B 8/4455 |
| 2011/0319743 | A1 * | 12/2011 | Satoh | A61B 5/0035 600/407 |

(Continued)

FOREIGN PATENT DOCUMENTS

| EP | 1398627 | A2 | 3/2004 |
|---|---|---|---|
| EP | 3232191 | A1 | 10/2017 |

(Continued)

OTHER PUBLICATIONS

International Search Report and Written Opinion received for PCT Application No. PCT/IB2023/053173, mailed on Jul. 4, 2023, 8 pages.

*Primary Examiner* — Jacques M Saint Surin

(57) ABSTRACT

An ultrasonic inspection device and method of inspecting parts is disclosed that uses significantly less memory and power with little drop in image quality. The device transmits on a full aperture of ultrasonic elements in a phased array but receives on only a fraction of that aperture. The device may be used downhole, in pipeline inspection or Non-Destructive Testing of manufactured parts.

19 Claims, 15 Drawing Sheets

(56) References Cited

U.S. PATENT DOCUMENTS

2021/0088480 A1  3/2021  Lepage
2021/0156994 A1  5/2021  Augenstein

FOREIGN PATENT DOCUMENTS

| EP | 4170339 A1 | 4/2023 |
| WO | 2019166332 A1 | 9/2019 |
| WO | 2021189130 A1 | 9/2021 |

* cited by examiner

[Fig. 1]
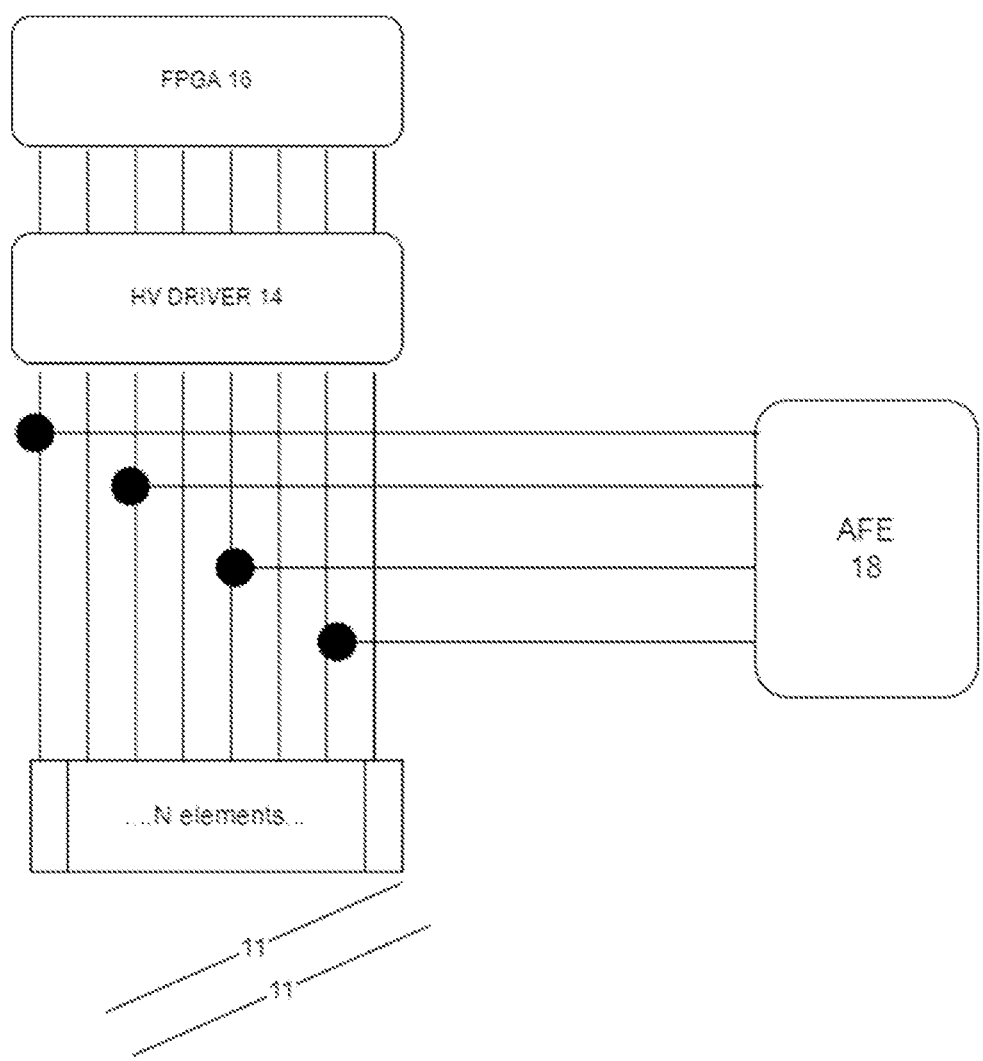

[Fig. 2]
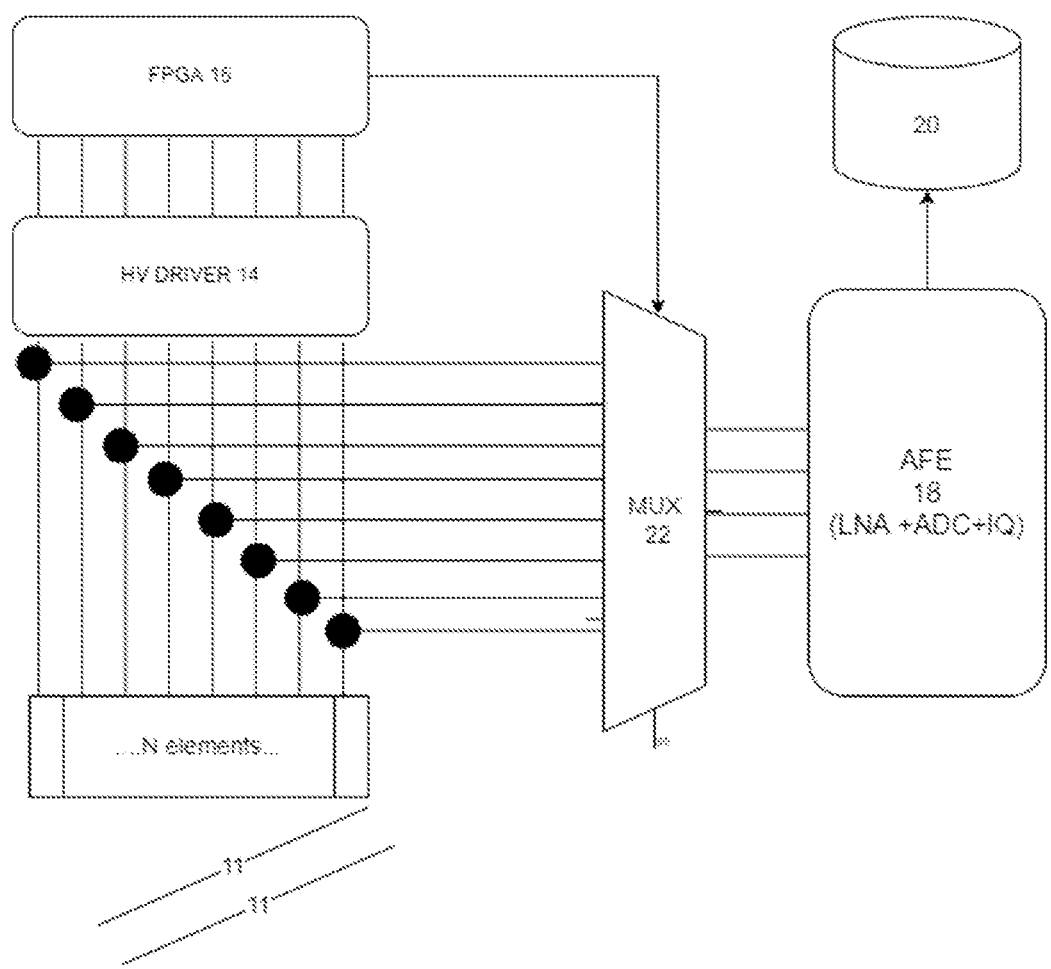

[Fig. 3A]
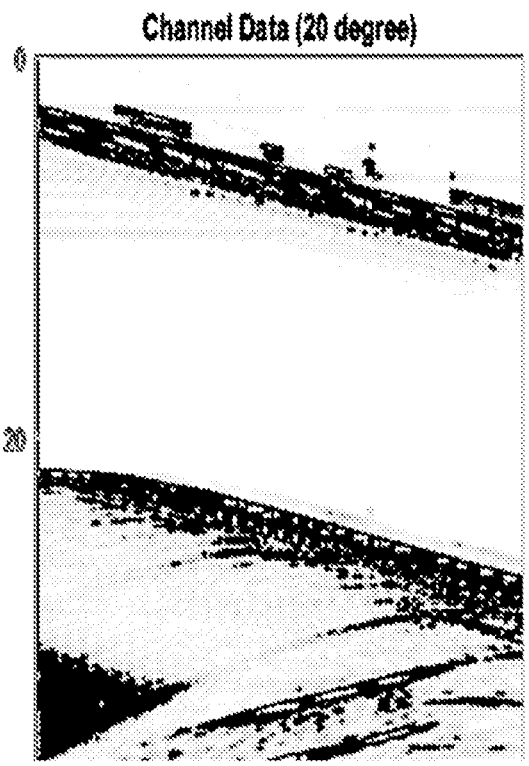
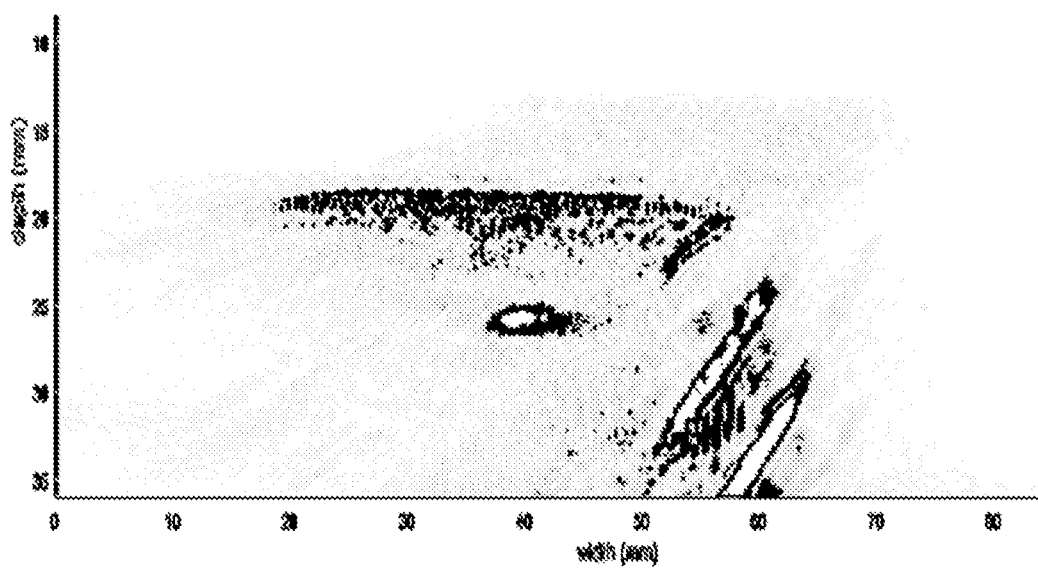

[Fig. 3B]
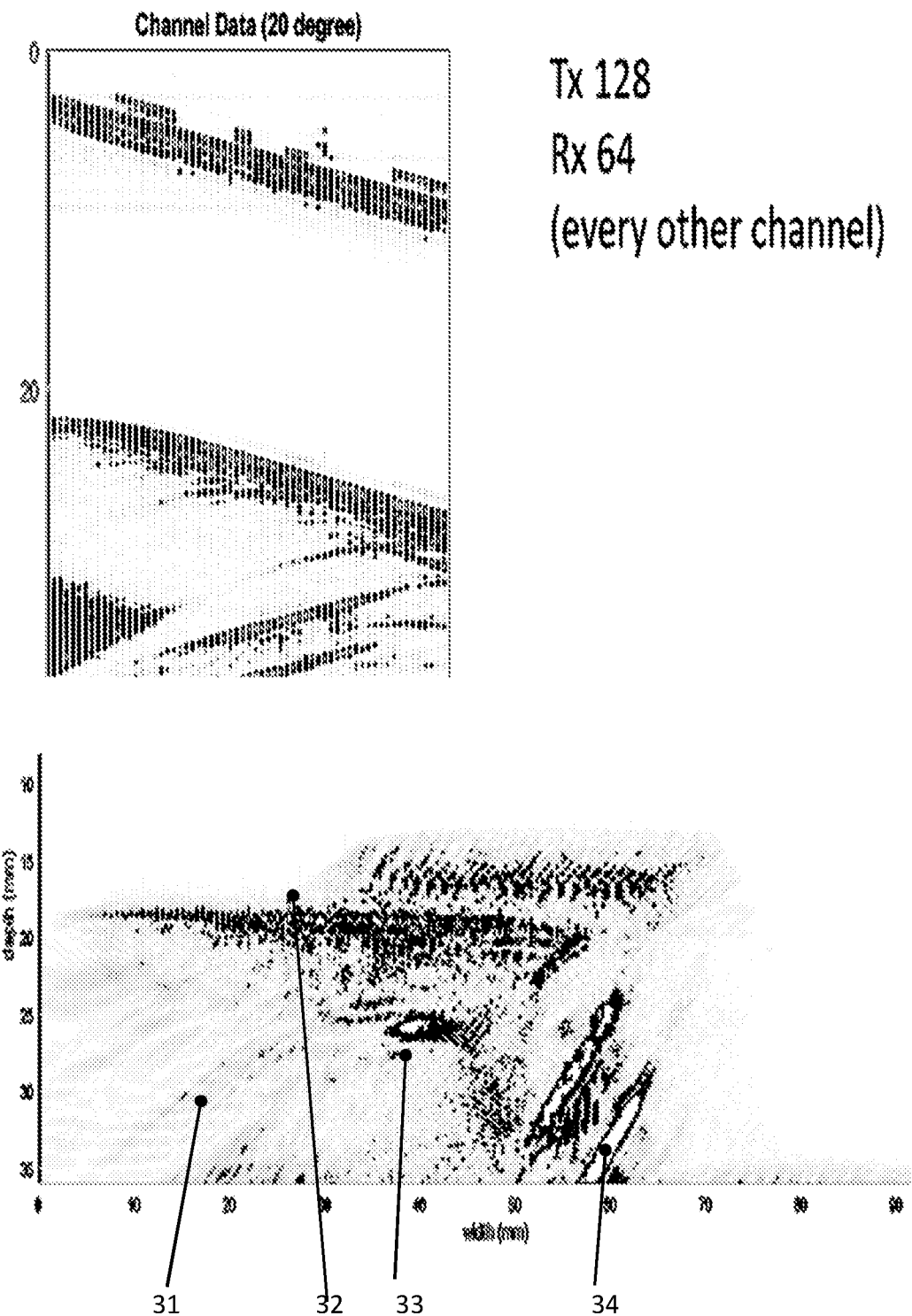

[Fig. 3C]
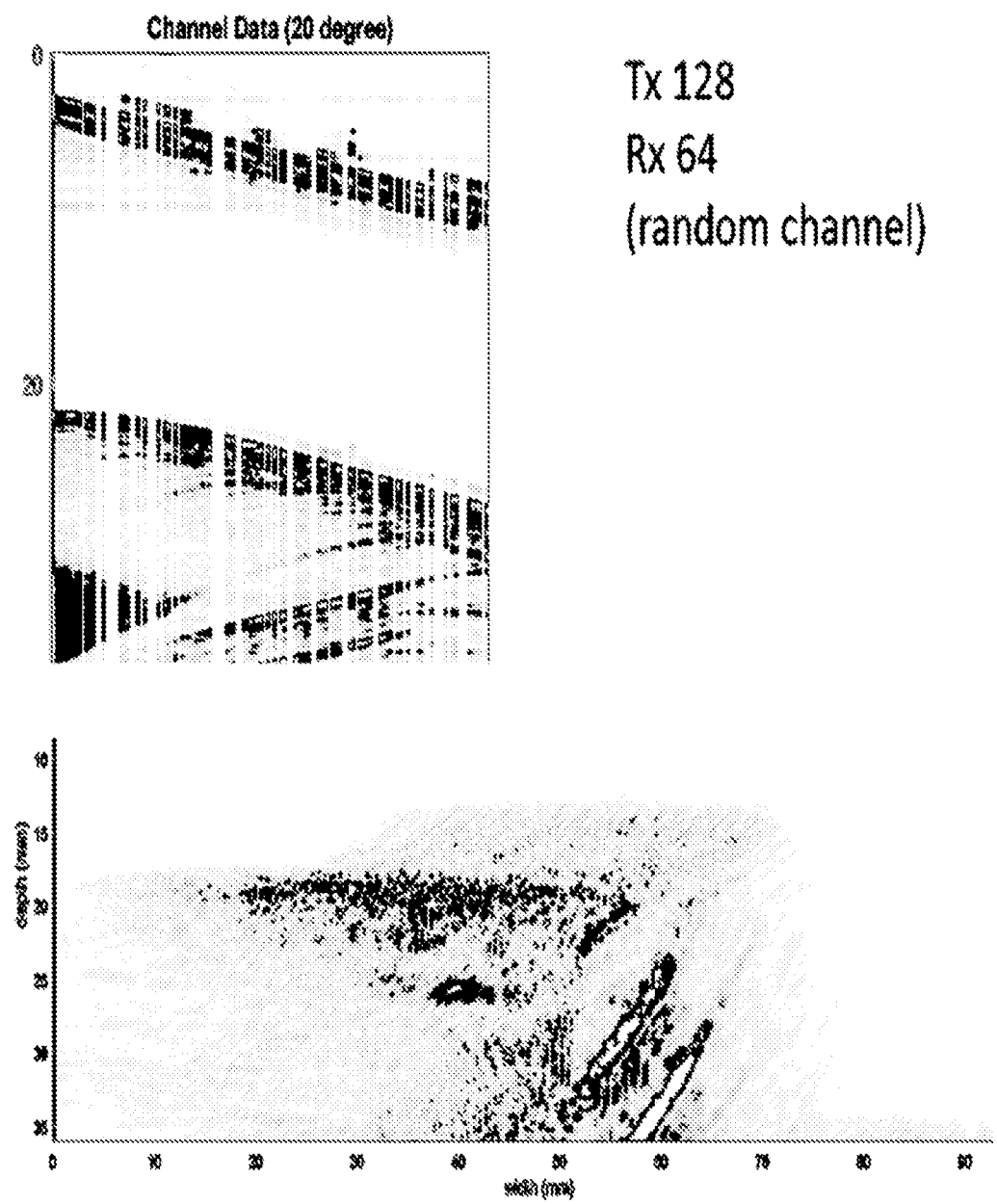

[Fig. 3D]
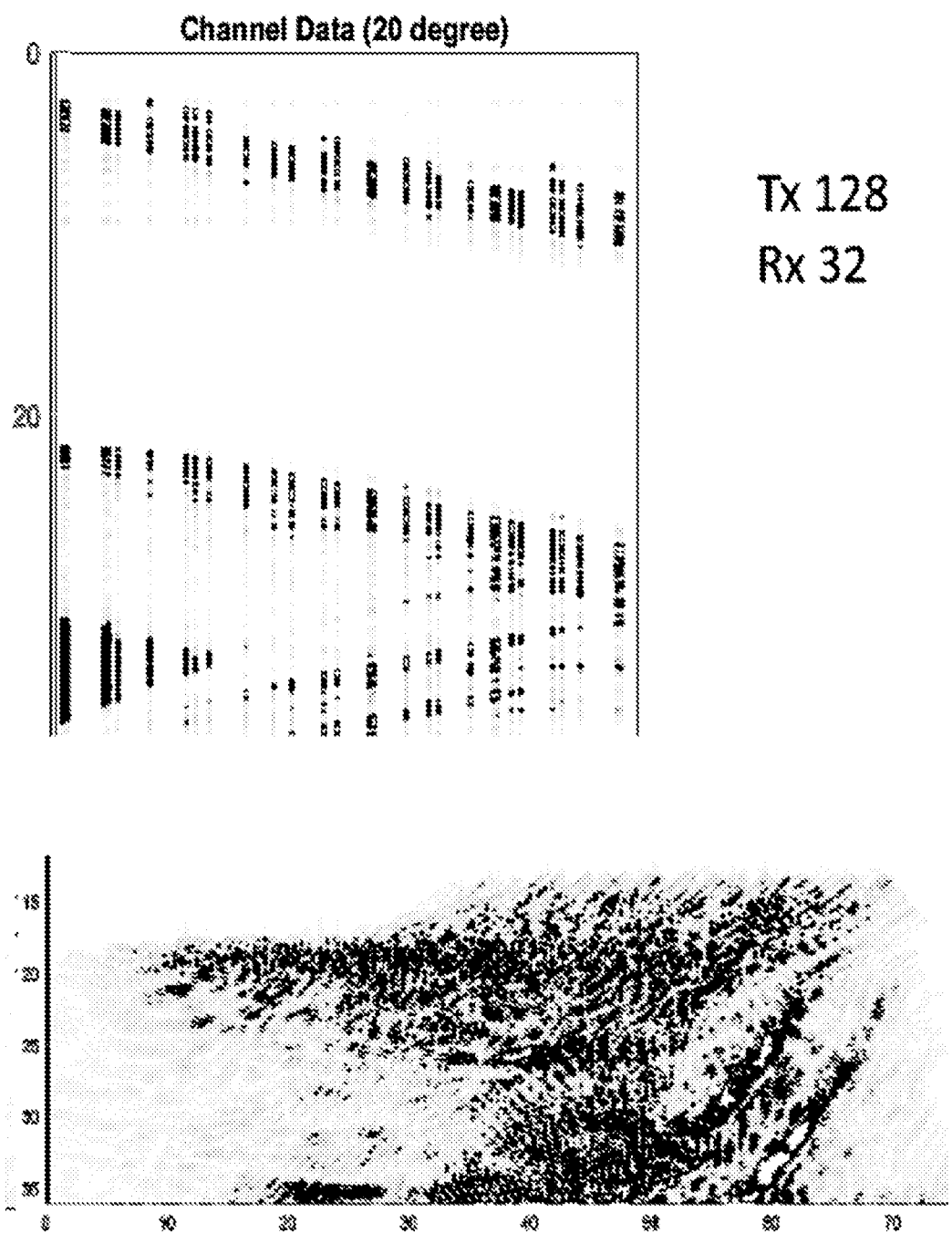

[Fig. 4]
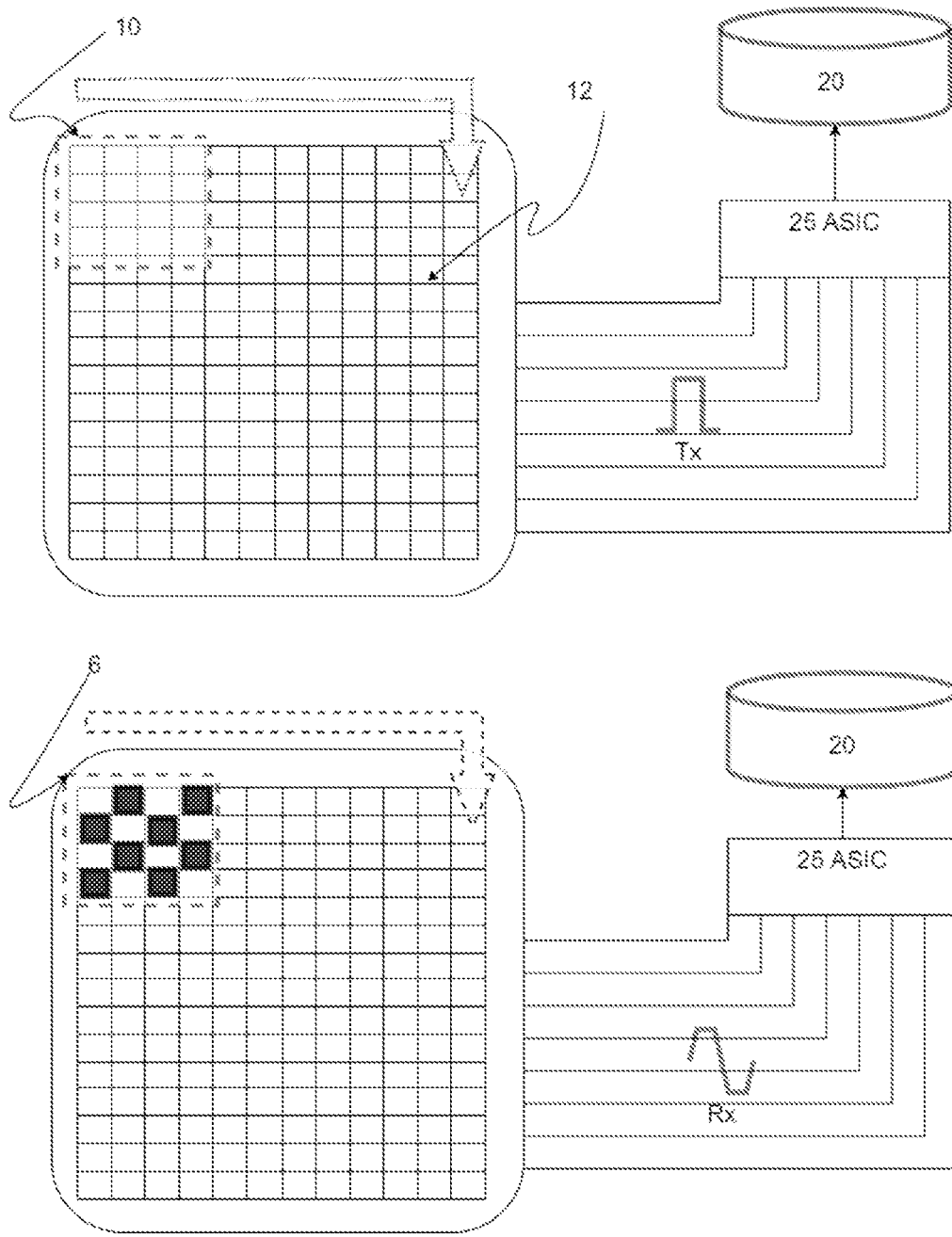

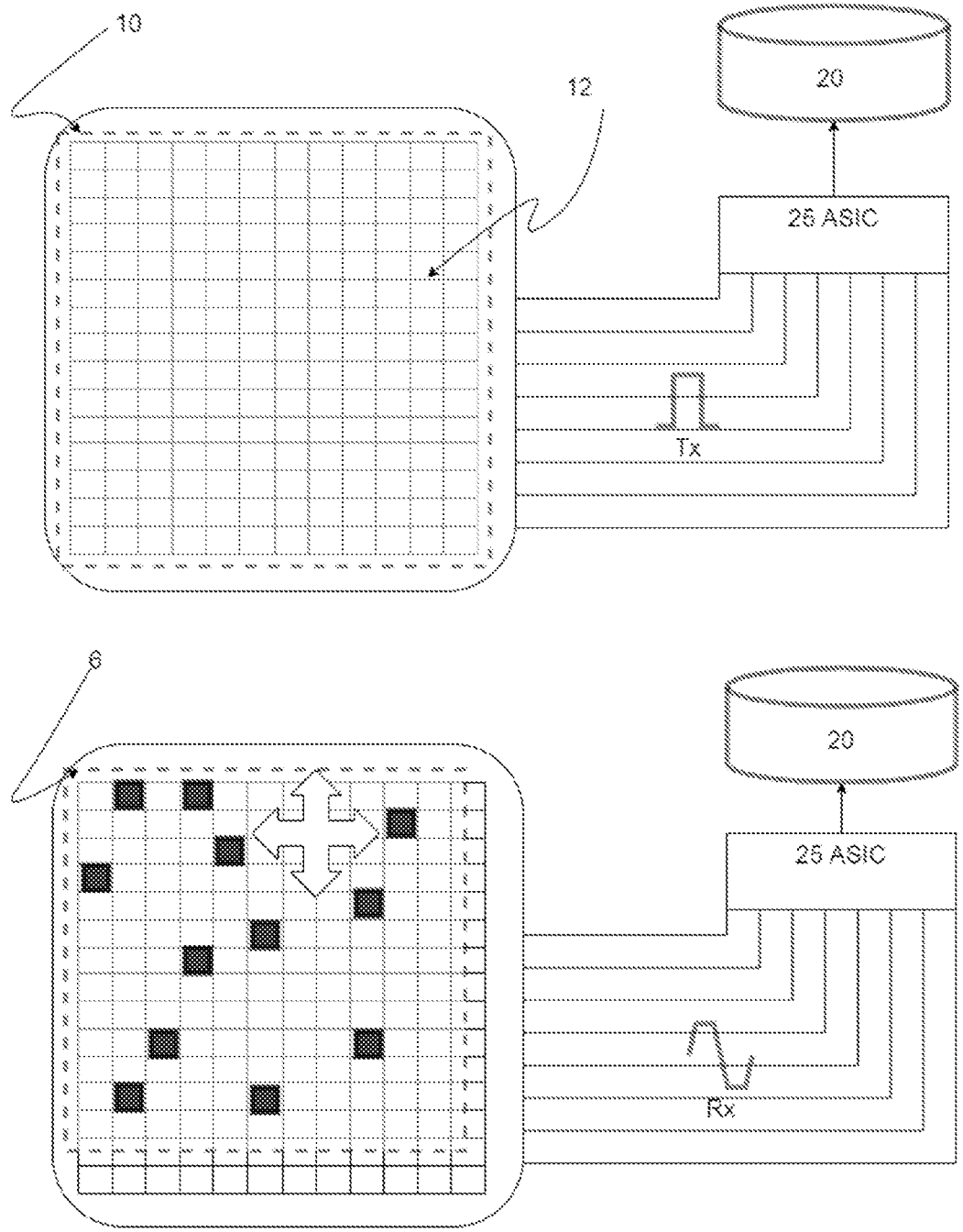
[Fig. 5]

[Fig. 6]
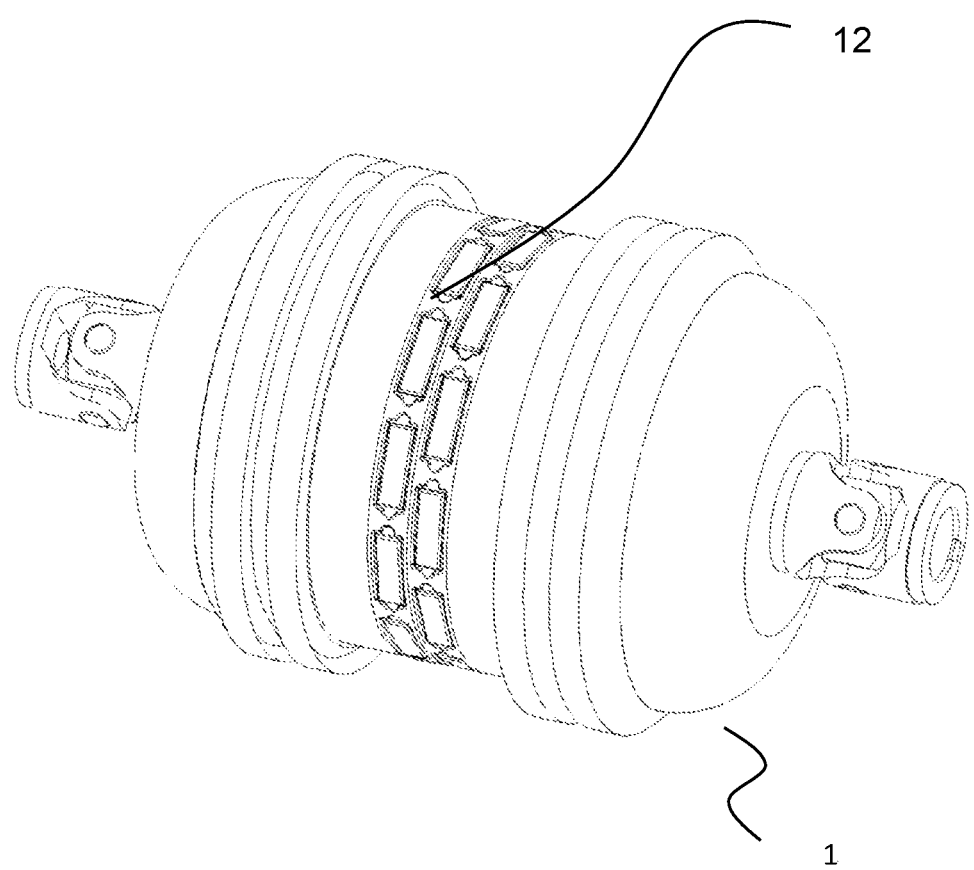

[Fig. 7]
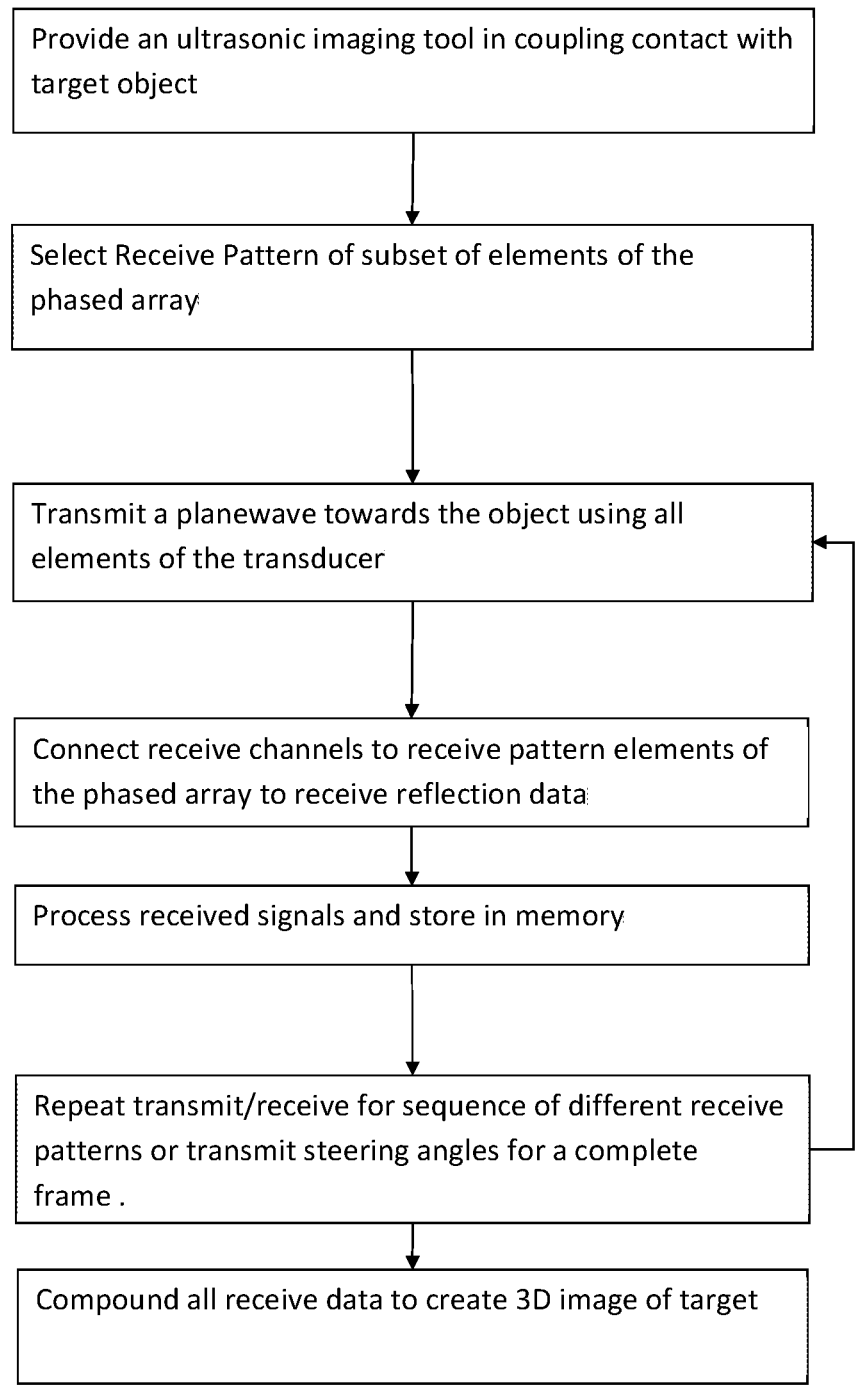

[Fig. 8]
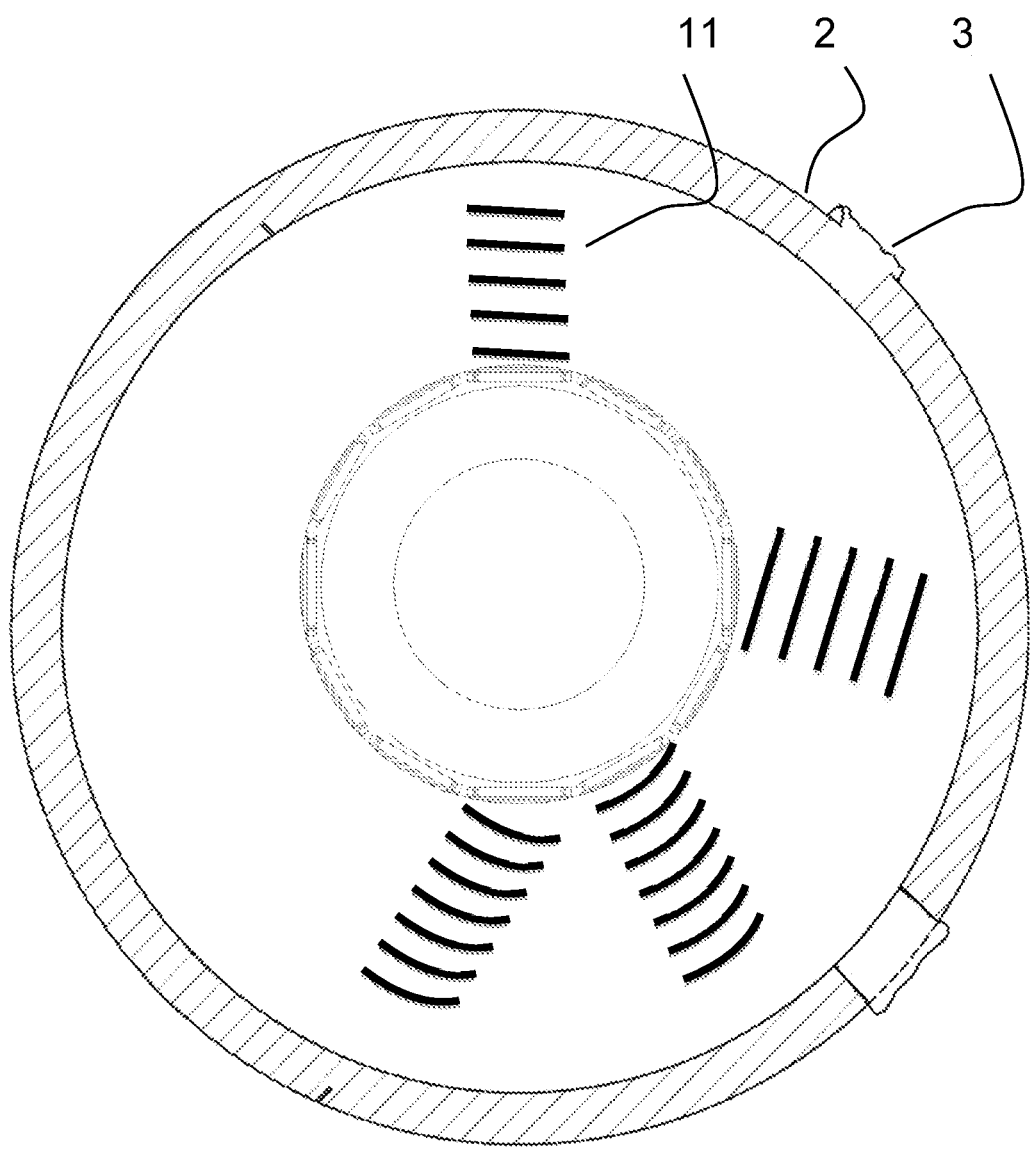

[Fig. 9]
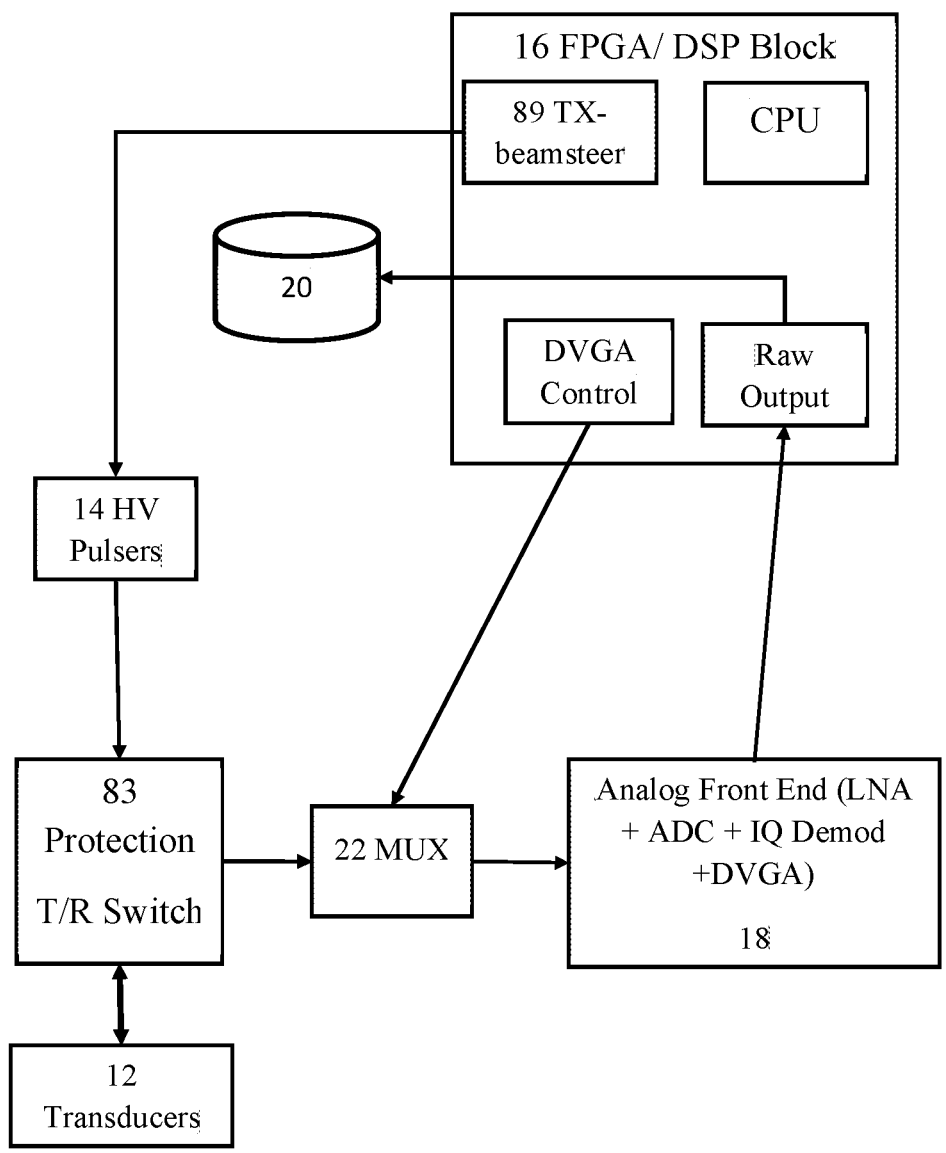

[Fig. 10]

[Fig. 11A]
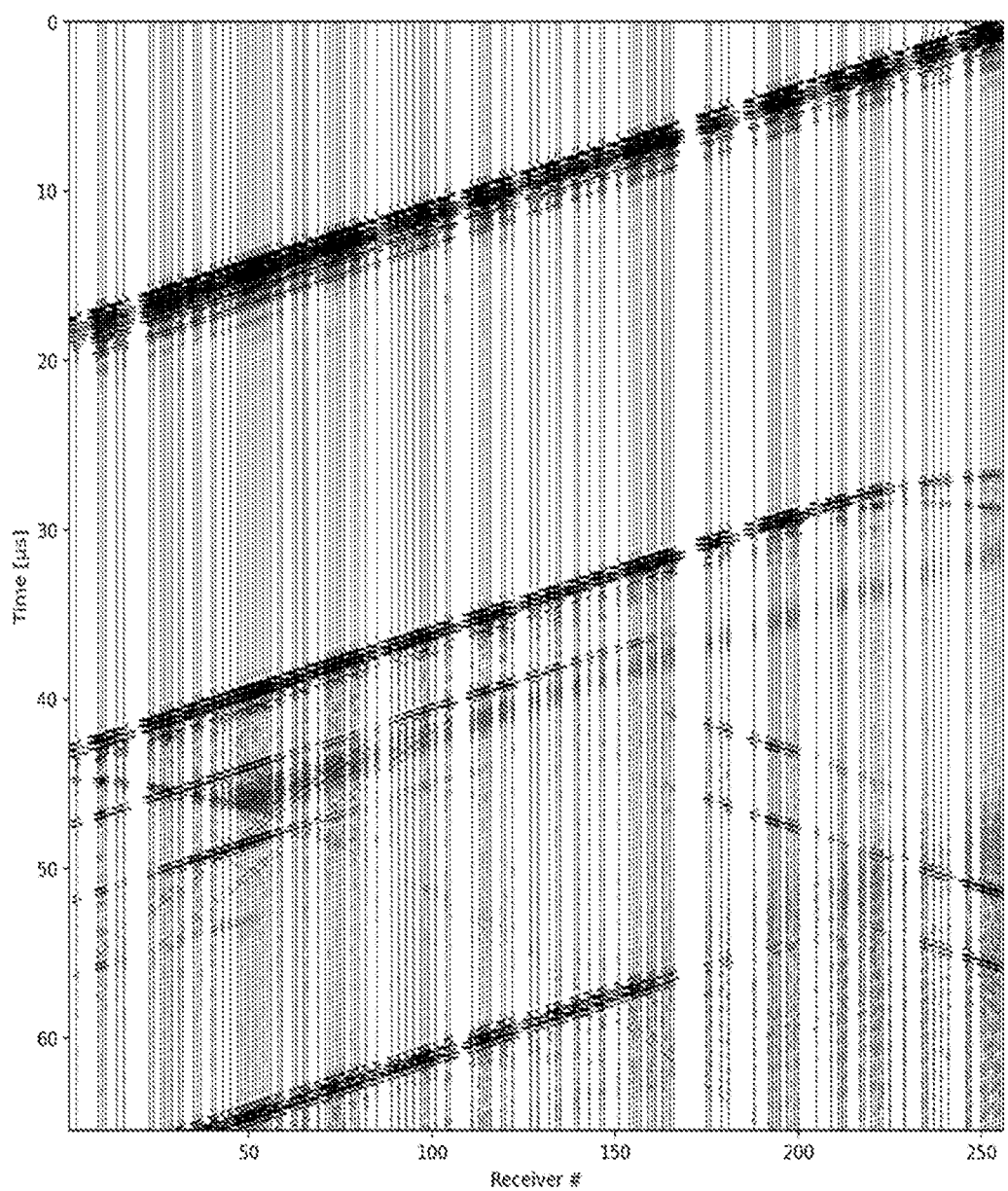

[Fig. 11B]
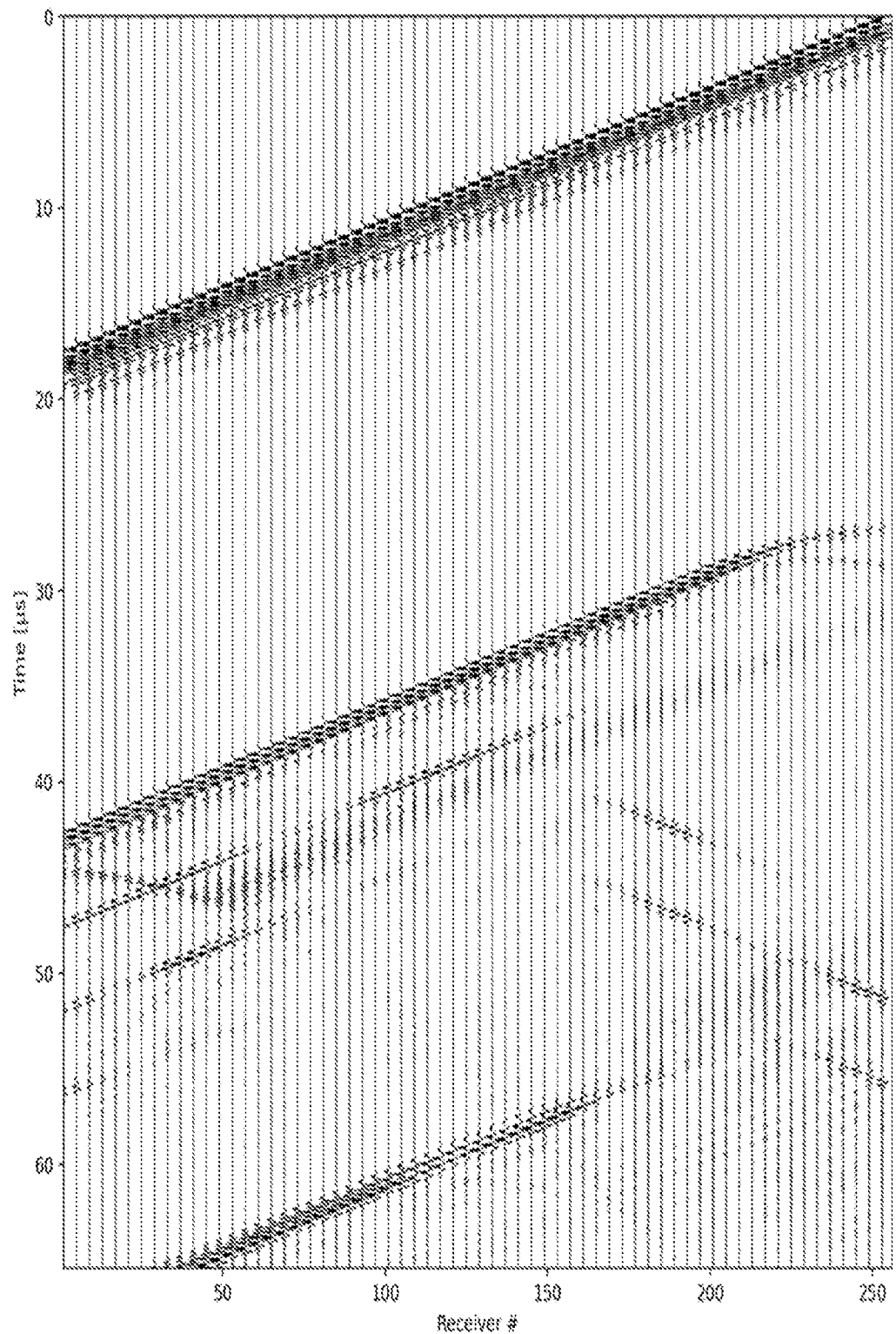

US 12,270,787 B1

INDUSTRIAL ULTRASONIC INSPECTION WITH SPARSE RECEIVE

RELATED APPLICATIONS

This application claims priority to United Kingdom Patent Application No. 2205225.2 filed on Apr. 8, 2022, which is incorporated herein by reference in its entirety.

TECHNICAL FIELD

The present invention relates to industrial ultrasonic system, in particular circuits and methods for transmitting and receiving signals of a phased array ultrasonic transducer.

BACKGROUND ART

Ultrasonic systems are often used to inspect mechanical parts, pipelines, welds, oil well casings, and boreholes for structural integrity. Defects such as cracks, internal voids, poor welds, and perforations can be detected from the acoustic reflections.

Ultrasonic phased array transducers are used for high resolution scanning by a highly dense set of ultrasonic elements that focus on and receive reflection data from a small area. The control circuits that transmit and receive signals from the array can be used to beamform and focused a wavefront towards the part being inspected. The adaptability and image quality of such systems make it an ideal non-destructive testing device.

However, as the number of elements in the array increases, the resolution increases and grating side lobes decreases but the complexity of the circuitry and data storage requirements increases.

SUMMARY

The present device and method enable high-resolution capture and visualization with lower requirements for data storage or transfer. A sparse receive techniques is employed to receive on far fewer ultrasonic elements than used to transmit a wave.

According to a first aspect of the invention there is a provided an industrial inspection device comprising: an ultrasonic phased array having ultrasonic elements; a drive circuit connected to the ultrasonic elements to transmit an acoustic wave; a receive circuit for receiving signals from acoustic reflections, the circuit having receive channels that are electrically connected to a subset of the ultrasonic elements that substantially spans a width of those transmit ultrasonic elements; and a memory for storing the received signals.

According to a second aspect of the invention there is a provided a method of operating an industrial inspection device having a phased array of ultrasonic elements. The method comprises: using a drive circuit to drive electrical signals to each of the ultrasonic elements to transmit an acoustic wave; receiving signals from acoustic reflections on a subset of the ultrasonic elements that were used to transmit at receive channels of a receive circuit; and storing the received signals in a memory of the device.

Preferred embodiment may include one or more of these additional novel features: the transmitted acoustic wave is a plane wave or defocused coherent wave; a width of the elements used to receive is at least 90% as wide as the elements used to transmit; the subset of elements for receiving is half or fewer of the elements used for transmitting; there are switches to electrically ground ultrasonic elements that are not connected to receive channels during the receiving signals during the receiving signals; there are switches to select which of the ultrasonic elements are connected to the receive channels of the receive circuit; the subset of elements for receiving is connected as a regular pattern of the elements used to transmit, preferably wherein every second element or every third element is connected to the receive channels; the subset of elements used to receive is connected as an irregular pattern of the elements used to transmit; the subset of elements used to receive is connected as a non-contiguous pattern of the elements used to transmit; the subset of elements used to receive are selected from a non-repeating pattern of the ultrasonic elements; the ultrasonic array is a two-dimensional array and the subset of elements for receiving is two-dimensional; a processor performs beamforming on the received signals to create an ultrasonic image from the received signals, wherein the beamforming uses a Total Focusing Method; the processer selecting the subset of elements connected to the receive channels each receive frame, which selected subset is selected to slide along the array over a plurality of receive frames; selecting a first subset of elements to receive during a first frame, then calculating differences between neighboring receive signals in real-time, then creating a second pattern based on the calculated differences to select a second subset of elements to receive during a second frame.

BRIEF DESCRIPTION OF DRAWINGS

The invention may be further described with reference to the appended drawings of preferred embodiments.

FIG. 1 is a circuit diagram for transmitting and sparsely receiving acoustic waves.

FIG. 2 is a circuit diagram for transmitting and sparsely receiving acoustic waves with selectable receive elements.

FIG. 3A is an image of channel data and the resulting image using all elements to receive.

FIG. 3B is an image of channel data and the resulting image using alternating elements to receive.

FIG. 3C is an image of channel data and the resulting images using a random ½ of the elements to receive.

FIG. 3D is an image of channel data and the resulting images using a random ¼ of the elements to receive.

FIG. 4 is an image of a two-dimensional array transmitting and sparse receiving on a sliding aperture of elements.

FIG. 5 is an image of a two-dimensional array sparse receiving on a random subset of elements.

FIG. 6 is an image of an In Line Inspection device having plural phased arrays.

FIG. 7 is a flowchart for transmitting and sparse receiving ultrasonic frames.

FIG. 8 is an end view of an imaging device in a tubular showing alternative planewaves.

FIG. 9 is a circuit diagram of components of transmit and receive circuits.

FIG. 10 is a beamformed image from a full array receive.

FIG. 11A is wiggle plot received from a random half of the elements.

FIG. 11B is wiggle plot received from a regular quarter of the elements.

DETAILED DESCRIPTION OF PREFERRED EMBODIMENTS

An industrial ultrasonic inspection device is described with reference to the attached drawings. In particular, FIG.

6 illustrates an Inline Inspection device having many arrays of ultrasonic elements operating as phased arrays. The circuits within the device drive the elements to generate a scanline or wavefront towards the component to be scanned. Additional circuits are arranged to receive reflections using a fraction of those elements and store them digitally in memory.

There is an inherent trade-off between image quality and coverage when designing an ultrasonic array with regard to pitch and size. A smaller pitch results in better image quality (reducing side lobes and minimizing acoustic artifacts), but this is at the expense of coverage, or the amount of the object that can be imaged per scan. This is simply because for a smaller pitch having the same element count, the total array length is smaller, and therefore has a smaller field of view. In industrial applications such as inspecting a long pipeline, wing of an aircraft or oilwell, a large field of view is needed to capture it within a reasonable period.

Conversely, making an array with larger pitch will capture a larger area of the object but the reflections captured will average over that larger area and have acoustic artifacts. Simply having an array with lots of elements and small pitch solves some of the imaging problems but greatly complicates the electronics, storage and image processing demands.

By way of example, the array may have 256 elements and a 0.2 mm pitch, instead of a comparably sized array of 128 elements and 0.4 mm pitch. All 256 elements are used during transmit, and every second, third or fourth element is used to receive. Transmitting on all the elements provides full acoustic power to the object to image. Note that the receive wiring skips elements, rather than just selecting a subset of contiguous elements from one side of the array.

The present ultrasound system works around this trade-off by having a high element count/small pitch array, which then transmits on all elements but only receives on a fraction of them, such as every Mth element. This way, the area imaged is as large as an array of 1/Mth the element count and M times the pitch, but with the image resolution found in small pitch arrays. Preferably M is 2, 3, or 4, i.e., the receive circuit's channels are not connected to ½, ⅔, or ¾ of the elements respectively. Non-integer skipping and irregular patterns are also possible under the sparse receive technique. The set of receive elements is substantially as wide as the whole array or at least the transmit array elements. Thus the received reflections have the widest field of view possible. For example, a selected receive pattern should ideally include the elements from extreme ends of the array, but the skilled person will appreciate that a receive array that is 90% as wide as the transmit array is contemplated as within this novel system.

The shape and size of an array or limitations of the electronics may mean that each transmit and receive event takes place on less than the full physical array, i.e., an aperture. For example, a 256-element array may operate with a 64-element transmit aperture that slides from one side to the other, capturing many smaller scanlines than if the whole array were pulsed and received at once. The method and circuits described herein would apply to that aperture in this case. That is, all elements of the aperture are pulsed during transmit but only a fraction of those elements are used during receive but the receive aperture is about as wide as the transmit aperture.

FIG. 3A provides the highest image quality, whereby all elements are used to receive. Skipping more elements in the receive step decreases the electrical complexity at the expense of image quality, as there are fewer pixels with information. As the images in FIG. 3B to 3E show, the image quality is not significantly degraded until M>4, i.e., less than ¼ of the elements are used to receive. In these figures, the top image represents the raw channel data for 128 elements, where all 128 were used to transmit (Tx) and some fraction of elements were used to receive (Rx). The streaks indicate where data are missing.

The lower images show the ultrasonic image after beamforming. FIG. 3B calls out certain regions of interest, in which 31 is an area of solid metal, 32 is the top surface, 33 is a void, and 34 is a vertical crack. Comparing these regions across the figures from high to low Rx count, shows noisy bands forming in the solid region 31, loss of surface definition 32, and merging of noise around the features at 33, 34. Additionally there more aliasing bands in the regular Rx pattern of FIG. 3B than the random Rx pattern of FIG. 3C.

An alternative representation of the receive data is shown in the wiggle plots of FIG. 11A, 11B. Wiggle data for a channel data shows how much signal is lost after decimating. FIG. 10 is a beamformed image from a full array receive, and grayscale beamformed data shows how degraded the reconstructions become when decimating. FIG. 11A provides a wiggle plot received from a random half of the elements and FIG. 11B is wiggle plot received from a regular pattern for only a quarter of the array's elements. Even though the data is halved, these sparse receive patterns decently image in comparison to the full receive image of FIG. 10. Regular channel data decimation introduces a consistent, detrimental aliasing effect when beamforming, which will attain its worst performance in grating lobe creation when it is exactly regular. The irregular pattern creates visual clumps of data which break up the regularity and therefore reduce grating lobes in the resulting image. If the noise is evenly distributed across channels, then the amount of noise should be the same independently of whether you decimate regularly or irregularly. The benefits of the irregular approach only appear once you beamform, as the grating lobes will be less prevalent Planewave The transmitted wave is preferably not focused at a point on the object to be imaged. The wavefront may be described as 'coherent,' 'weakly focused,' 'defocused,' 'unfocused,' 'plane wave', 'spherical', 'spiral', 'divergent,' or 'non-convergent' in as much as the transmitted waves may have some theoretical focal point within or behind the transducer. Thus, the sonified area is large and the imaging rate is increased compared to prior art focused beams. Advantageously, the reflected wave comprises micro reflections from plural features of interest in a single frame that can be delineated and captured by the receive-side beamformer.

As shown in FIG. 8, the transmitted waves 11 may be a plane or curved wavefront, the former having a flat front and the latter having a front that is substantially curved or arc-shaped. Curved/arc-shaped waves can be seen as the polar coordinate equivalent of planar waves. These shapes are created by phase delays set in the FPGA and computed by the onboard CPU. Notably, these fronts do not converge or focus on the surface of object 2.

The transmitted wavefront from the transducer towards a curved target, such as a pipeline or casing, is preferably an arc as well, rather than a flat plane wave. Preferably the curved wavefront 11 hits the inside of the tubular at the same angle of incidence relative to the Normal of the surface of the pipeline along the whole area of sonification. The angle of incidence is what defines the overall steering angles for a transmit. This transmit may be computed by ray tracing, knowing the array position relative to the pipe, pipe geometry, SoS of fluid, and array geometry. This provides two advantages: 1) consistent reflection strength from the inner surface and 2) consistent creation of a shear wavefront within the metal pipe.

Circuit

FIG. 1 is a simplified circuit diagram showing the transducer of N elements. FPGA 16 sets the phase delays and High Voltage Pulsers 14 pulse the transducer elements to transmit coherent wavefront 11. On the receive circuit 18 side, receive channels connect some of the transducer elements to amplifiers and signal processors within the Acoustic Front End (AFE) to output digital data for every frame that is then stored in data storage 20. In this every-other-element skip pattern, the electronics on the receive side are simplified with half as many connectors, amplifiers and storage needed.

FIG. 2 provides an alternative circuit in which all the elements are connected to the receive circuit but switchable in real-time to connect a flexible pattern to the receive channels. Here the switch is Multiplexer 2, which may also be controlled by the FPGA. Low Noise Amplifier (LNA), Analogue-to-Digital Converters (ADC) and IQ Demodulator components are also indicated.

Advantageously, phased arrays can focus and steer the coherent wavefront towards different areas of the target using transmit beamforming, as known in the art. Delays stored or programmed into the FPGA control the timing of transmit pulses that the drive circuit sends to individual elements of the array or aperture.

FIG. 9 illustrated components of the drive and receive circuits, which may be commercially available. The skilled person will appreciate that these circuits may be created using different components and chips. Within the transmit circuit are the transmit beamsteering 89 and high voltage pulser 14. A multiplexer on the transmit circuit (not shown) may be used when selecting an aperture of less than the whole array for transmit. During the receive phase, certain elements of transducer 12 are connected by MUX 22 to the Analog Front End 18. The digital data output from Analog Front End 18 is processed through the FPGA 16 to memory 20.

In the system of FIGS. 4 and 5, an ASIC is connected to all the elements of the 2D phased array and selection of transmit and receive elements is flexibly controlled within the ASIC. The amplifiers, filters, and ADCs within the ASIC are thus reduced, as well as the memory requirements.

In FIG. 4 the ASIC controls an aperture 10 that slides to the right and then down (or any other pattern) for transmitting (Tx) a scanline on the 4×4 elements shown. During the receive (Rx) part of the cycle, a pattern representing a fraction of those elements are received, processed and stored in memory 20. As shown, a checkboard of half of the aperture is selected for receive.

FIG. 5 shows a transmit aperture 10 and receive aperture 6 that is substantially as wide as the transmit aperture, but with an irregular pattern of receive elements (in black squares). The irregular pattern may be altered for each receive frame to build up a more complete image of the object. The ASIC may switch around the receive elements using a set of stored patterns or by using a shifting algorithm to move the pattern up, down, across, diagonal, etc. until the required image quality is reached. Thus, the receive circuitry can be greatly reduced to receive only a tiny fraction of the elements but eventually acquire the same image as the full receive case.

Random and Irregular Patterns

In one embodiment, the sparse receive channels are selected according to a pattern that does not simply alternate or repeat. This pattern may be a (pseudo) random selection or sets of different predetermined patterns. The purpose is to avoid aliasing artifacts that may be present when repeating the default alternating pattern. This aliasing may occur because of how the fixed wavelength, fixed pitch and fixed receive pattern constructively interfere to create artefacts. The irregular or variable pattern tends to cancel the energy from those effects.

This irregular or random receive pattern may be a) hard-wired to connect the receive channels to preselected, fixed elements or b) selectable in real-time using a controller and switches, such as multiplexer 22. The pattern(s) may be stored in the memory of the device, as a set of elements to receive or algorithm that results in that set of elements. The memory may also store the particular receive pattern that was used for the stored channel data of a given frame. Thus, different patterns may be used over the course of a long inspection and then imaged later from knowledge of what elements were used. This selection becomes memory intensive if the selection were truly random and changing for every frame. Thus, to reduce memory, a random seed may be stored so that the pseudo-random selection can be reconstructed at a later time.

Preferably, the receive pattern includes transducer elements at ends of the array end (or edges of a 2D array). The pattern preferably is selected to minimize the difference between an image generated by all transducer elements (i.e full array) and the one generated with the sparse pattern, where the differences take into account image data returned by features of interest in the object that is, cracks in different locations of the target within the field of view of the probe. This is in contrast to optimizing for total signal returned or returned from the inner/outer object surfaces, which are of less interest.

The (pseudo) randomization may be determined by the receive circuit, FPGA, or ASIC, in order to control the MUX that select elements to be received. There may be some spatially neighboring elements that are selected in one frame or selected in back-to-back frames, but this will appear as white noise over the whole scan. The right-most-side FIGS. 3C and 3D shows examples of random patterns for element selection.

To avoid the randomly selected pattern from accidentally 'clumping' over neighboring elements, the array may be logically divided into several strata, each having multiple adjacent elements (e.g. each strata has $1/8^{th}$ of the total elements). The irregular pattern or random selection takes place for the elements within each stratum, which selection may be repeated for each stratum. For example, in a 256-element array, there may be eight strata of 32 elements each, whereby half of the elements are used to receive (potentially corresponding to certain circuit components that take 16 channels). An exemplary set of {1, 3, 7, 8, 9, 11, 12, 15, 19, 20, 22, 25, 26, 27, 30, 31} selects corresponding elements within each stratum. Any clumping will be offset by at least 32 elements over the whole array. More preferably, lines are physically stratified and selected irregularly or randomly from within each stratum.

In another embodiment to avoid aliasing, regular patterns may be used but different patterns are used for sequential frames. For example, plural received frames use a) every odd element, then b) every even element, then c) every third element, then d) skip two, receive on two elements, then repeat.

Smart Sampling

In one embodiment, receive patterns are adapted from frame to frame in response to perceived features in the objects. The intention is to increase the receive element density for regions for the transducer that have interesting signals, while reducing density from regions without. So, while a generally low resolution or uniform distribution of receive elements is appropriate for monotonous portions of the target, the system can increase resolution where features such as cracks, weld, and perforation are detected.

The device's receive circuit monitors the receive channels in real-time using one or more criteria to determine that a given channel's signals indicate a feature of interest. Such algorithmic criteria include a) difference between signals of physically neighboring elements (based on their analogue, digital, raw or demodulated data); b) sudden differences in signals for a given element from one frame to the next; c) total receive intensity; and c) intensity spikes. Algorithms based on intensity, in particular, spikes in intensity beyond the first surface reflection indicate edges of a feature. Algorithms based on differences may indicate that there was a feature caught by one element but not another (or not caught previously in time), whereby increasing local receive density may capture the edges of that feature.

For example, a device may be continually inspecting a large object using uniform sparse receive of one-quarter of the elements. Upon detecting an intensity spike for the centermost elements, the receive pattern changes to much higher density (up to 100% receive) at the center, while keeping a low or lowered density for elements at the edge of the transducer. When signals from those center elements drops off, the uniform spare receive pattern is resumed. Thus, the memory used for the feature and available for image reconstruction is much higher than the monotonous part of the object.

In post processing, the processor uses beamforming to determine image values for each pixel in the component. Using known beamforming methods, such as the Total Focussing Method, the processor's algorithm performs a delay and sum and/or correlation/similarity of the channel's data to arrive at the image value for each pixel, but in the present case there will be half or less as many receive channels from which to sample. The algorithm simply skips over any channel that has no data, which may mean skipping alternating channels in the 2Tx:1Rx case or irregularly skipping channels in the 'random' or 'irregular' case.

Owing to the sparse receive pattern, some transmit elements do not have a corresponding signal in the receive data. In post processing, the processing unit may interpolate the sparse receive to recover the "missing" receive signals. This would be done to reduce artefacts due to the inconsistent or poor sampling frequency (in space, along the elements) but also due to grating/side lobes. The interpolation can be done using standard or unsupervised methods in the time-domain (e.g., nearest, linear, cubic, Makima, or spline) or in the frequency-domain (e.g., fk or POCS). An alternative approach is data-driven/supervised by interpolating (e.g.,) along the slope/phase of the received hyperbolae.

If no interpolation technique is used prior to beamforming to "recover" the signals for the inactive elements in receive (sparse pattern), this step can be achieved by the beamforming algorithm itself. Indeed, by summing the delayed signals appropriately the pixel intensity/phase can be computed everywhere, even in front of the "missing" channels. However, for the energy to be uniform, and have meaning, the processing unit should weight the channels appropriately before summation since some pixels may have less channels due to the sparse receive.

FIGS. 3A-C provides example channel data captured for 128Tx channels comparing a) full 128 Rx; b) 64 Rx alternating; and c) 64 Rx random. The surfaces and cracks of the component (including repeat reflections) can be seen, with missing data as expected for b) and c). FIGS. 3B, 3C shows that after beamforming, the images of the component are similar in quality, even though only half the channel data was provided.

In high density arrays, especially 2D arrays, tightly packed conductors between array and circuits, can lead to crosstalk between neighboring conductors. Using the sparse receive solution, the device's circuits are arranged to switch the non-receiving conductors to ground during the receive phase to reduce such crosstalk. There may be an interconnect layer between electrodes of the full array and the ASIC bond pads. Once the ASIC has selected the subset of elements to receive on, it then switches the remaining elements to ground.

The applications for such an ultrasonic system and method may include In-Line Inspection (ILI) of pipelines, non-destructive testing (NDT) of manufactured parts and borehole inspection (e.g., cased or uncased wells for water or oil). The ultrasonic device may vary in the array size, element count, array dimensionality, and number of arrays depending on the logging speed, size of the components and types of defects to detect. The present Sparse Receive technique and circuitry may be applied to each of these arrays to reduce memory and electrical circuitry demands.

For example, ILI devices (see FIG. 6) may comprise many arrays, offset from each other to inspect a large pipeline, while moving at high speed. Terabytes of reflection data are received and stored—data that may be greatly reduced by reducing the number of receive channels. The circuitry to support the large number of arrays may similarly be reduced. In preferred embodiments, a plurality of transducers are distributed around the circumference of the device to insonify the entire circumference of the pipeline, more preferably with overlap in the transducers and insonified coverage.

These transducers may be axially spaced-apart for practical fitting reasons but a complete image of the pipeline can be stitched together in post processing.

In another example, an NDT device may comprise a 2D phased array that contacts the target object and is moved around to inspect different areas for defects. While the total memory requirements may be less than ILI, having a reduced data set enables wireless transmission to a computing device. The slower nature of such an inspection also means that the object can be redundantly scanned, using potentially even fewer receive channels, and then reassembled for imaging. Additionally, there may be several steering angles (cartesian or polar coordinates based on the pipe/media/array geometry) used. The set of images from plural steering angles, plural receive frames may then be compounded to create a high-resolution 3D image of the object.

For example, a 64×64 element array may transmit on all 4096 elements and receive on a smaller subset of only 64 total elements. This subset may be user-selectable or fixed for a given application. Similarly, the number of steering angles may be user-selectable or fixed for a given application. In use the device may quickly move over the object where there are no features of interest at the basic receive pattern and steering angle, but then stop or slow down when features are detected. At that point the device begins to fill in the compounded image with additional angles and receive patterns until the user moves on or a signal-to-noise threshold is reached.

The array may transmit several times on the full 2D array and then sparsely receive on a 64 element subaperture (of any shape), then slide that subaperture over the full array. Preferably the array is not programmed to re-receive on the same elements as the subaperture slides around. The fully combined receive pattern is preferably as wide as the width of the array and a sparse subset of the transmit array. The receive pattern is preferably different for repeats of receiving events. Preferably the systems pre-selects the full receive pattern for the whole array and then breaks down receive sequences into N receive subapertures, ie. N frames per sequence, where N may be 16 or 32 for example. A sequence refers to several frames that capture the same area of the target. A sequence may be a combination of plural frames, often of different steering angles (in this case a subset of the larger sparse pattern). One frame is an excitation of transmit pulses followed by one receive.

It will be appreciated that data processing may be performed with plural processors on the device or a remote computer. The term 'processor' is intended to include computer processors, microcontrollers, firmware, GPUs, FPGAs, and electrical circuits that manipulate analogue or digital signals. For example, a large array may be connected to several driver chips and several receive AFEs. Alternatively, these circuits may be combined into an ASIC designed for a particular array with maximum flexibility. While it can be convenient to process data as described herein, using software on a general computer, many of the steps could be implemented with purpose-built circuits.

It will be appreciated that the various memories discussed may be implemented as one or more memory units. Non-volatile memory is used to store the received channel data and instructions so that the device can function without continuous power. Volatile memory (RAM and cache) may be used to temporarily hold raw data and intermediate computations.

The invention claimed is:

1. An industrial inspection device comprising:
   an ultrasonic phased array having ultrasonic elements;
   a drive circuit connected to the ultrasonic elements to transmit an acoustic wave;
   a receive circuit for receiving signals from acoustic reflections, the circuit having receive channels that are electrically connected to a subset of the ultrasonic elements that substantially spans a width of those transmit ultrasonic elements; and
   a memory for storing the received signals,
   wherein a width of the elements used to receive is at least 90% as wide as the elements used to transmit.

2. The device of claim 1, wherein the transmitted acoustic wave is a plane wave or defocused coherent wave.

3. The device of claim 1, wherein the subset of elements for receiving is half or fewer of the elements used for transmitting.

4. The device of claim 1, further comprising switches to electrically ground ultrasonic elements that are not connected to receive channels during the receiving signals during the receiving signals.

5. The device of claim 1, further comprising switches to select which of the ultrasonic elements are connected to the receive channels of the receive circuit.

6. The device of claim 1, wherein the subset of elements for receiving is connected as a regular pattern of the elements used to transmit, wherein every second element or every third element is connected to the receive channels.

7. The device of claim 1, wherein the subset of elements used to receive is connected as an irregular pattern or a non-contiguous pattern of the elements used to transmit.

8. The device of claim 1, wherein the subset of elements used to receive are selected from a non-repeating pattern of the ultrasonic elements.

9. A method of operating an industrial inspection device having a phased array of ultrasonic elements, the method comprising:
   using a drive circuit to drive electrical signals to each of the ultrasonic elements to transmit an acoustic wave;
   receiving signals for acoustic reflections from a subset of the ultrasonic elements that substantially spans a width of those transmit ultrasonic elements receiving signals from acoustic reflections; and
   storing the received signals in a memory of the device, wherein a width of the elements used to receive is at least 90% as wide as the elements used to transmit.

10. The method of claim 9, wherein the subset of elements for receiving is half or fewer of the elements used for transmitting.

11. The method of claim 9, further comprising switching ultrasonic elements that are not connected to receive channels to an electrical ground during the step of receiving signals.

12. The method of claim 9, wherein the subset of elements for receiving is connected as a regular pattern of the elements used to transmit, wherein every second element or every third element is connected to the receive channels.

13. The method of claim 9, wherein the subset of elements connected to the receive channels is a random selection.

14. The method of claim 9, wherein the subset of elements used to receive is connected as an irregular pattern or as a non-contiguous pattern of the elements used to transmit.

15. The method of claim 9, further comprising selecting a non-repeating pattern of the subset of elements to connect to the receive channels over a plurality of receive frames.

16. The method of claim 9, further comprising using a processor to perform beamforming on the received signals to create an ultrasonic image from the received signals.

17. The method of claim 16, wherein the beamforming uses a Total Focusing Method.

18. The method of claim 9, further comprising selecting the subset of elements connected to the receive channels each receive frame, which selected subset is selected to slide along the array over a plurality of receive frames.

19. The method of claim 9, further comprising selecting a first subset of elements to receive during a first frame, then calculating differences between neighboring receive signals in real-time, then creating a second pattern based on the calculated differences to select a second subset of elements to receive during a second frame.

* * * * *